US012308919B2

(12) United States Patent
Ahmed Salem et al.

(10) Patent No.: US 12,308,919 B2
(45) Date of Patent: May 20, 2025

(54) CHANNEL STATE INFORMATION OVERHEAD REDUCTION FOR MULTI-TRANSMISSION RECEPTION POINT/PANEL AND CELL FREE MULTIPLE INPUT, MULTIPLE OUTPUT

(71) Applicant: NOKIA TECHNOLOGIES OY, Espoo (FI)

(72) Inventors: Rana Ahmed Salem, Munich (DE); Mihai Enescu, Espoo (FI); Youngsoo Yuk, Seoul (KR); Keeth Saliya Jayasinghe Laddu, Espoo (FI); Salah Eddine Hajri, Antony (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/611,528

(22) Filed: Mar. 20, 2024

(65) Prior Publication Data

US 2024/0235641 A1 Jul. 11, 2024

Related U.S. Application Data

(63) Continuation of application No. 17/753,348, filed as application No. PCT/IB2019/057455 on Sep. 4, 2019, now Pat. No. 12,040,869.

(51) Int. Cl.
*H04B 7/06* (2006.01)

(52) U.S. Cl.
CPC ......... *H04B 7/0626* (2013.01); *H04B 7/0634* (2013.01)

(58) Field of Classification Search
CPC ........ H04B 7/06; H04B 7/024; H04B 7/0456; H04B 7/0626; H04B 7/0634;
(Continued)

(56) References Cited

U.S. PATENT DOCUMENTS 10,219,259 B2 2/2019 Kubota et al.
12,040,869 B2 * 7/2024 Ahmed Salem ..... H04B 7/0658
(Continued)

FOREIGN PATENT DOCUMENTS

CN 109495230 A 3/2019
EP 2498530 A1 9/2012

OTHER PUBLICATIONS

International Search Report and Written Opinion for International Application No. PCT/IB2019/057455, mailed Jun. 23, 2020, 19 pages.
(Continued)

*Primary Examiner* — Shawkat M Ali
(74) *Attorney, Agent, or Firm* — Brake Hughes Bellermann LLP

(57) ABSTRACT

Techniques of performing CSI reporting include identifying a cluster of TRPs sharing common information in their CSI and transmitting a complete CSI report to a selected TRP of the cluster while transmitting partial CSIs reports to other TRPs of the cluster. Along these lines, in an example implementation, a UE receives a CSI-RS from a network, with the CSI-RS carrying a plurality of reference symbols from a plurality of TRPs. Based on the plurality of symbols, the UE generates TRP data representing CSI feedback for each of the TRPs. From the CSI feedback, the UE identifies, as a cluster, a subset of the TRPs that share common information within the CSI feedback. The UE then sends first identification data identifying the subset of the TRPs that make up the cluster to the network.

28 Claims, 5 Drawing Sheets

(58) Field of Classification Search
CPC ......... H04B 7/0658; H04L 5/00; H04L 25/02; H04W 16/18; H04W 22/10; H04W 48/20; H04W 64/00; H04W 72/04; H04W 72/12; H04W 72/14
USPC ........ 370/254, 333; 375/219, 260, 267, 295, 375/316
See application file for complete search history.

(56) References Cited

U.S. PATENT DOCUMENTS

| | | |
|---|---|---|
| 2013/0294288 A1 | 11/2013 | Choi et al. |
| 2018/0302888 A1 | 10/2018 | Stirling-Gallacher et al. |
| 2019/0260448 A1 | 8/2019 | Rahman et al. |
| 2020/0015250 A1 | 1/2020 | Yang et al. |

OTHER PUBLICATIONS

Office Action for India Application No. 202247019318, mailed on Aug. 2, 2022, 8 pages.
Ahmed et al.; "Comparison of Explicit CSI Feedback Schemes for 5G New Radio"; 2019 IEEE 89th Vehicular Technology Conference (VTC2019-Spring); Kuala Lumpur, Malaysia; Apr. 28-May 1, 2019; 4 pages.
Communication pursuant to Article 94(3) EPC for European Patent Application No. 19769914.3, mailed on Aug. 29, 2024, 6 pages.
Office Action with English translation for Indonesian Application No. P00202203638, mailed Dec. 19, 2024 (mistakenly identified as May 20, 2024), 6 pages.
Office Action for Chinese Patent Application No. 201980101982.4, mailed on Mar. 3, 2025, 9 pages.

\* cited by examiner

US 12,308,919 B2

CHANNEL STATE INFORMATION OVERHEAD REDUCTION FOR MULTI-TRANSMISSION RECEPTION POINT/PANEL AND CELL FREE MULTIPLE INPUT, MULTIPLE OUTPUT

RELATED APPLICATIONS

This is a continuation patent application of U.S. Ser. No. 17/753,348, filed Feb. 28, 2022, entitled "CHANNEL STATE INFORMATION OVERHEAD REDUCTION FOR MULTI-TRANSMISSION RECEPTION POINT/PANEL AND CELL FREE MULTIPLE INPUT, MULTIPLE OUTPUT" which is a national stage entry of International Application No. PCT/IB2019/057455, filed Sep. 4, 2019, both of which are hereby incorporated by reference in their entireties.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in an attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, by controlling circuitry of a user equipment (UE), transmission and reception point (TRP) data representing respective channel state information (CSI) feedback for a plurality of TRPs connected to a network; performing an identification operation on the TRP data to identify a subset of TRPs of the plurality of TRPs, each TRP of the identified subset of TRPs having a common portion within their respective CSI feedback; and transmitting, to the network, identification data representing the identified subset of TRPs.

According to an example implementation, an apparatus includes at least processor and at least one memory including computer program code, the at least one memory and the computer program code configured to, with the at least one processor, cause the apparatus at least to receive transmission and reception point (TRP) data representing respective channel state information (CSI) feedback for a plurality of TRPs connected to a network; perform an identification operation on the TRP data to identify a subset of TRPs of the plurality of TRPs, each TRP of the identified subset of TRPs having a common portion within their respective CSI feedback; and transmit, to the network, identification data representing the identified subset of TRPs.

According to an example implementation, an apparatus includes means for receiving, by controlling circuitry of a user equipment (UE), transmission and reception point (TRP) data representing respective channel state information (CSI) feedback for a plurality of TRPs connected to a network; means for performing an identification operation on the TRP data to identify a subset of TRPs of the plurality of TRPs, each TRP of the identified subset of TRPs having a common portion within their respective CSI feedback; and means for transmitting, to the network, identification data representing the identified subset of TRPs.

According to an example implementation, a computer program product includes a computer-readable storage medium and storing executable code that, when executed by at least one data processing apparatus, is configured to cause the at least one data processing apparatus to receive transmission and reception point (TRP) data representing respective channel state information (CSI) feedback for a plurality of TRPs connected to a network; perform an identification operation on the TRP data to identify a subset of TRPs of the plurality of TRPs, each TRP of the identified subset of TRPs having a common portion within their respective CSI feedback; and transmit, to the network, identification data representing the identified subset of TRPs.

According to an example implementation, a method includes receiving, by controlling circuitry of a network processor and from a user equipment (UE), first identification data representing a set of transmission reception points (TRPs) of a plurality of TRPs; determining a quality of backhaul connections between the set of TRPs; and adjusting the first identification data based on the determined quality of backhaul connections between the set of TRPs to produce second identification data.

According to an example implementation, an apparatus includes at least processor and at least one memory including computer program code, the at least one memory and the computer program code configured to, with the at least one processor, cause the apparatus at least to receive first identification data representing a set of transmission reception points (TRPs) of a plurality of TRPs; and adjust the first identification data based on the determined quality of backhaul connections between the set of TRPs to produce second identification data.

According to an example implementation, an apparatus includes means for receiving, by controlling circuitry of a network processor and from a user equipment (UE), first identification data representing a set of transmission reception points (TRPs) of a plurality of TRPs; means for determining a quality of backhaul connections between the set of TRPs; and means for adjusting the first identification data based on the determined quality of backhaul connections between the set of TRPs to produce second identification data.

According to an example implementation, a computer program product includes a computer-readable storage medium and storing executable code that, when executed by at least one data processing apparatus, is configured to cause the at least one data processing apparatus to receive first identification data representing a set of transmission reception points (TRPs) of a plurality of TRPs; determine a quality of backhaul connections between the set of TRPs; and adjust the first identification data based on the determined quality of backhaul connections between the set of TRPs to produce second identification data.

The details of one or more examples of implementations are set forth in the accompanying drawings and the description below. Other features will be apparent from the description and drawings, and from the claims.

DETAILED DESCRIPTION

Figure 1:
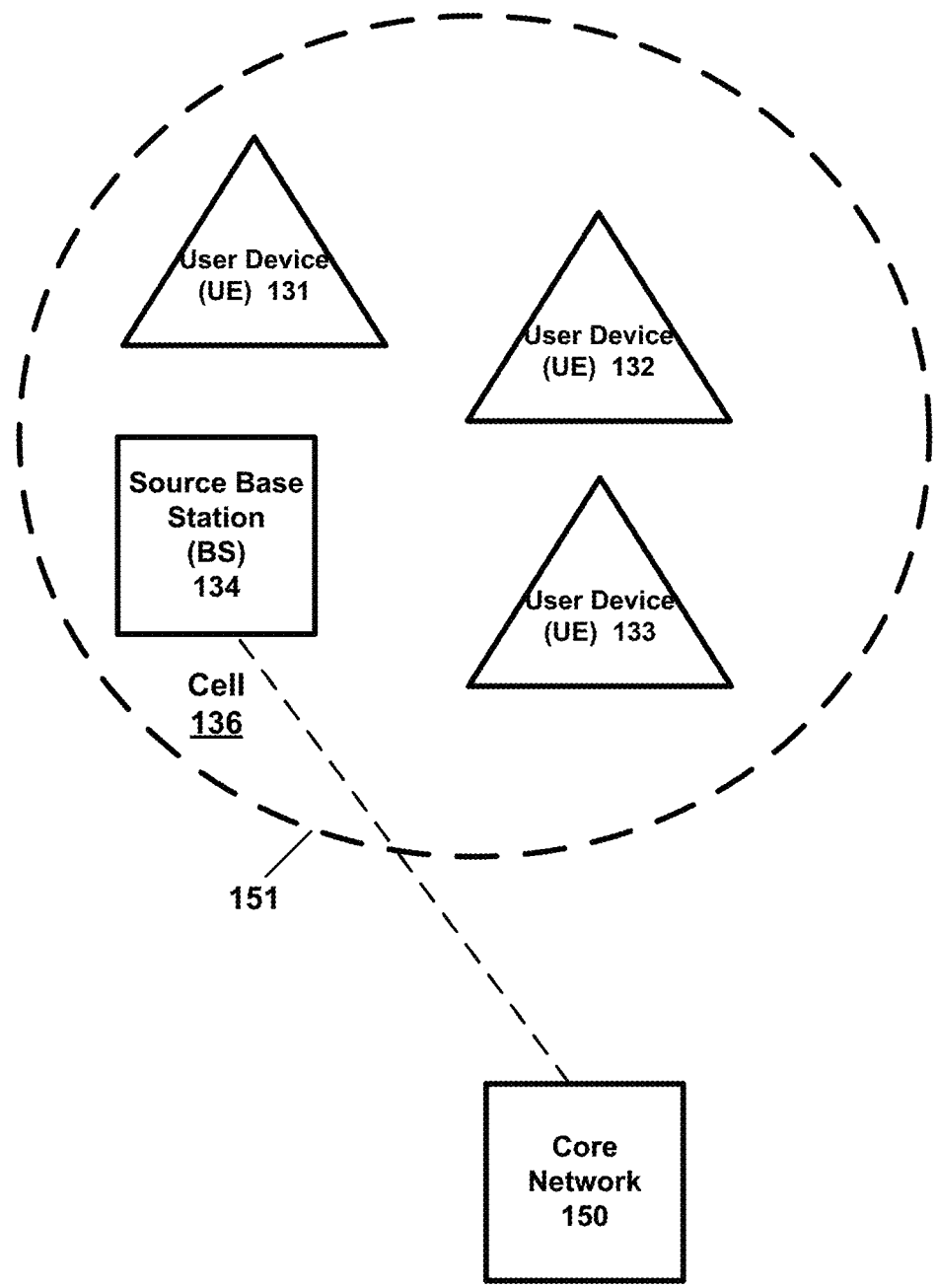
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) also may be carried out by any node, server or host which may be operably coupled to a transceiver, such as a remote radio head. BS (or AP) 134 provides wireless coverage within a cell 136, including to user devices 131, 132, and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), enhanced mobile broadband, massive machine type communications (MMTC), vehicle-to-vehicle (V2V), vehicle-to-device, etc. Each of these use cases, or types of UEs, may have its own set of requirements.

Some aspects of 5G New Radio (NR) is based on a beamformed air interface. Being able to beamform radio signals is critical as beamforming enables a concentration of radiated energy on its intended targets and increase receiver sensitivity to desired signals. Beamforming capability may be achieved by increasing a number of antennas at a base station (gNB) and user equipment (UE). In 5G NR, gNBs may be capable of wielding many more antenna elements than those in 4G. Nevertheless, such capabilities are conditioned on the need to obtain accurate estimates of channel state information (CSI).

One use case for multi-transmission receiver point (TRP) transmission is joint transmission, which includes simultaneous transmission of data to a given UE from multiple TRPs. This may be performed in a coherent or non-coherent manner. In ongoing Rel-16 3GPP multi-TRP discussions, non-coherent joint transmission (NC-JT) is considered with both multiple PDCCH (Physical Downlink Control Channel) and single PDCCH designs.

Joint transmission requires the availability of accurate CSI at the TRPs to leverage the beamforming-based air interface of 5G NR. In addition, in order to deliver gains in throughput or any other major network key performance indicator (KPI).

Nevertheless, at least for single PDCCH design in Rel-16, it is essential that TRPs exchange the received channel state information. A similar requirement may be needed in other design choices expected in Rel-17 discussions. Nevertheless, due to backhaul speed limitations and different propagation delays, timing errors cannot be completely removed. In addition, obtaining accurate CSI estimates for cooperating TRPs and feeding them back in a timely manner may prove to be a challenging task, especially with a limited feedback capacity.

Consequently, a specific CSI estimation scheme for multi-TRP is needed.

A CSI report may include one or more of the following:
A Rank Indicator (RI), which is a suitable number of transmission layers for a downlink (DL) transmission;
A Precoder Matrix Indicator (PMI), which indicates what a device estimates as a suitable precoder matrix based on the selected rank; and
A Channel Quality Indicator (CQI), which indicates what the device estimates as a suitable channel coding rate and modulation scheme based on the selected precoder matrix.

In Rel. 15 3GPP, a precoder matrix W is written as $W=W_1W_2$, where $W_1$ is the grid-of-beams matrix of size $2N_1N_2 \times 2L$ composed of L orthogonal vectors/beams per polarization r from a set of oversampled $O_1O_2N_1N_2$ DFT beams, where $N_1$ and $N_2$ are the number of antenna ports in horizontal and vertical domains. $O_1$ and $O_2$ are the oversampling factors in both dimensions; and $W_2$ is a matrix of size $2L \times N_3$, where $N_3$ is the number of PMI frequency subbands. $W_2$ carries the linear combining coefficients used to cophase the long-term spatial beams per subband.

In Rel.16 3GPP, $W_2$ is further compressed by an $N_3 \times M$ frequency domain (FD) compression matrix $W_f$, where M is the number of FD components. The precoder matrix W for each layer and across frequency-domain units is $W=W_1\tilde{W}_2W_f^H$, where $\tilde{W}_2$ is a $2L \times M$ matrix of linear combining coefficients, and H denotes a Hermitian, i.e., conjugate transpose.

For time domain explicit CSI feedback, the channel frequency response $H_{2LN \times N_a}$ is compressed via projection matrix $$P_{s_{N_a \times N_s}}.$$

N is the number of receive antennas, $N_a$ is the number of active subcarriers and $N_s$ is the length of the common channel support i.e. location of active taps among all transmit-receive beams.

$$G_{2LN \times N_s}^{est}(t) = H_{2LN \times N_a} P_{s_{N_a \times N_s}}.$$

The columns of $$P_{s_{N_a \times N_s}}$$

are drawn from DFT basis at the locations of the common channel support.

$$P_{s_{N_a \times N_s}}$$

can be regarded as the counterpart of the FD basis subset matrix $W_f$ in Rel.16 3GPP.

The long-term CSI components of the CSI feedback for Rel.15 3GPP and time domain explicit feedback are as follows:
Spatial domain: Grid-of-beam (GoB) matrix $W_1$,
Frequency/Time: FD basis subset $W_f$/Projection matrix $$P_{s_{N_a \times N_s}}.$$

In a conventional multi-TRP scenario, a UE may be simultaneously connected to many TRPs. Each can have its own complexity range, from a small panel with 4 antenna ports to a macro base station with 64 antenna ports. Accurate CSI feedback requires non-negligible payload in uplink control signalling, especially for type II CSI codebook.

This results in an uplink signalling bottleneck that is aggravated in multi-TRP. Indeed, in such a scenario, the uplink CSI feedback overhead not only increases significantly based on the number of TRPs but also with the number of UE connections.

This issue prompted work on FD compressed Type II CSI in Rel-16 3GPP in order to reduce CSI reporting overhead. However, this does not completely solve the problem of uplink CSI overhead, especially, for multi-TRP scenarios.

In contrast to the above-described conventional multi-TRP scenario, improved techniques of performing CSI reporting include identifying a cluster of TRPs sharing common information in their CSI and transmitting a complete CSI report to a selected TRP of the cluster while transmitting partial CSIs reports to other TRPs of the cluster. Along these lines, in an example implementation, a UE receives a CSI-RS from a network, with the CSI-RS carrying a plurality of reference symbols from a plurality of TRPs. Based on the plurality of symbols, the UE generates TRP data representing CSI feedback for each of the TRPs. From the CSI feedback, the UE identifies, as a cluster, a subset of the TRPs that share common information within the CSI feedback. The UE then sends first identification data identifying the subset of the TRPs that make up the cluster to the network. In some implementations, the network identifies a cluster of TRPs and the UE then selects a subset of that cluster based on the generated TRP data. In some implementations, the network, after receiving the first identification data, generates second identification data identifying some TRPs of the cluster based on a quality of backhaul connections between the TRPs.

Advantageously, transmitting only a full CSI feedback to one TRP of a cluster and smaller amounts of information to the other TRPs of the cluster reduces uplink CSI overhead. For example, when the CSI feedback includes a grid-of-beams matrix $W_1$, and the common information includes some columns of this matrix, then UE may send CSI feedback corresponding to a primary TRP to the primary TRP and only the columns of the grid-of-beams matrix $W_1$ that are not common to the TRPs of the cluster to each of the other, secondary TRPs. In this way, the information common to the TRPs of the cluster—in this case, the columns of the grid-of-beams matrix $W_1$ that are common to the TRPs of the cluster, may be communicated from the primary TRP to the secondary TRPs of the cluster via the backhaul connections.

Figure 2:
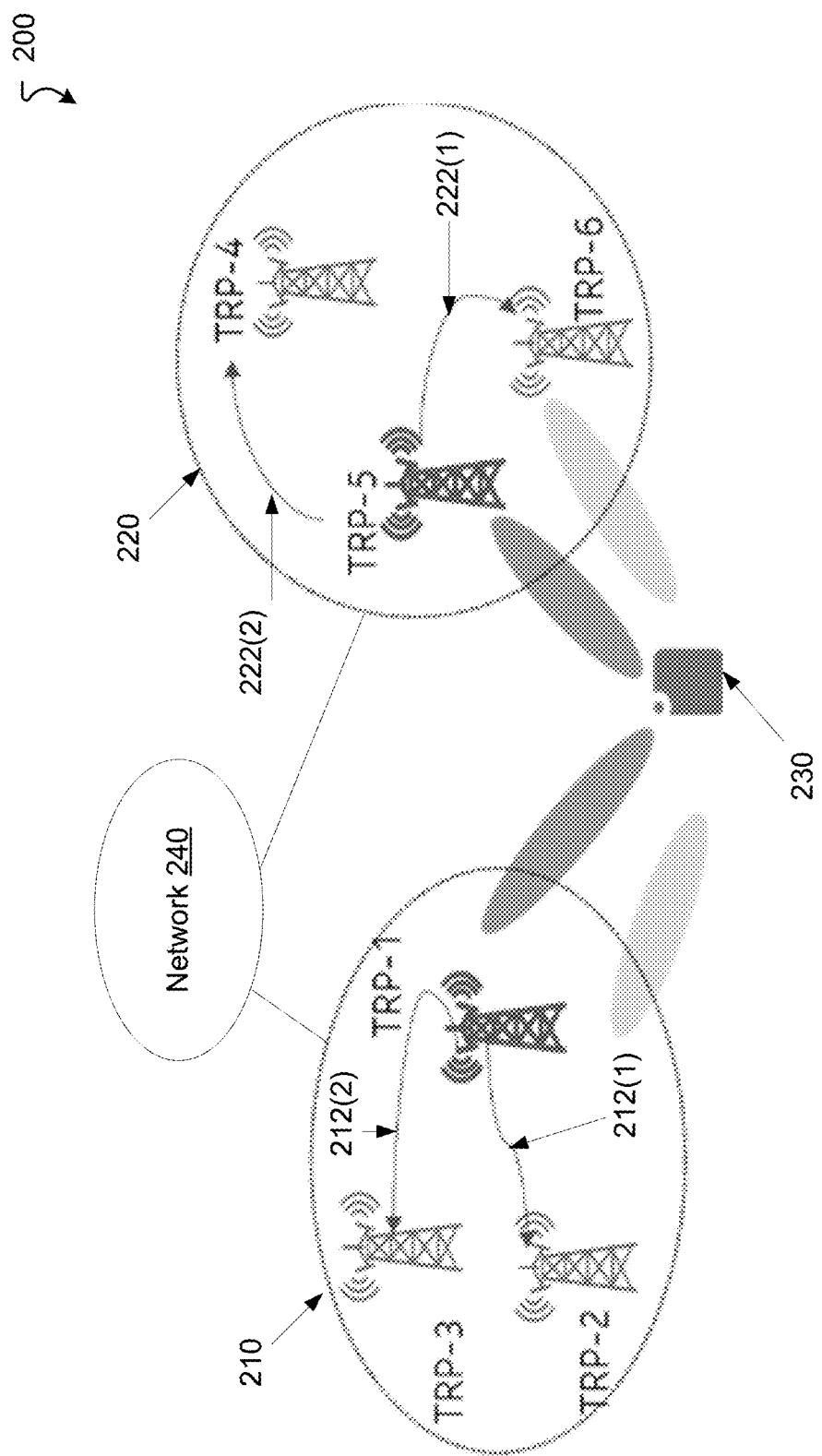
FIG. 2 is a diagram illustrating clusters of TRPs according to an example implementation.

FIG. 2 is a diagram illustrating clusters of TRPs 200 according to an example implementation. In the implementation illustrated in FIG. 2, there are two clusters 210 and 220 of three TRPs each. The TRPs in cluster 210 are connected by backhaul connections 212(1) and 212(2), and the TRPs in cluster 220 are connected by backhaul connections 222(1) and 222(2). A UE 230 determines the clusters 210 and 220 based on common information in CSI feedback for each of the TRPs. The TRPs in CSI clusters 210 and 220 and UE 230 are connected to a network 240.

The improved techniques leverage correlation in the long-term CSI, i.e. on channels spatial structure and/or support for close TRPs/Panels. Indeed, in high/medium density deployment scenario, when the distance between a group of TRPs/panels and the UE 230 is larger than the inter-TRP/Panel distance, the wireless channels between the latter TRP/Panel group and the UE will be characterized by correlated spatial subspaces and temporal support in the time domain.

The UE 230 is able to detect commonalities in the long-term CSI among several TRPs based on CSI-RS measurements and hence group them into two clusters, alternatively the clustering can also be done based on SSB measurements. The TRP grouping is based on measurements of the UE 230, i.e. a UE-specific clustering, and hence, it is specific to a UE. For example, a different UE in a different location may not see the same CSI commonality among TRPs 1, 2 and 3. It is also important to note that the UE 230 can be connected to more than one cluster (e.g., clusters 210 and 220) simultaneously, i.e., it is not assumed that all TRPs to which the UE is connected will have a commonality in the long term CSI. In this IR, the TRPs within one cluster in which they all show commonality in long-term CSI for one UE are referred to as a CSI cluster.

The UE 230 may always be connected to one or more TRPs within each CSI cluster 210 and 220. From a perspective of the UE 230, there may be a primary TRP or reference TRP which is determined by the CSI feedback for TRPs within a CSI cluster 210 or 220. Accordingly, there can be two classes of TRPs exist over the full set of TRP: primary TRPs (reference TRPs) and secondary TRPs. The following approaches for communicating CSI feedback may be used:

A full UL CSI feedback is carried out between the UE and the primary TRP (reference TRP) within a CSI cluster, A partial UL CSI feedback is carried out between the UE and any TRP within a cluster.

Subsequently, the long-term CSI between the UE and the primary TRP (reference TRP, e.g., TRP-1) is shared within the CSI cluster 210 such that the secondary TRPs (e.g., TRP-2 and TRP-3) can deduce something about the long-term CSI between the UE and the secondary TRPs. The UE 230 may still have to provide a reduced amount of long-term CSI feedback characterizing the link to the secondary TRPs. Note that sending the CSI information to the primary TRP is one implementation option; the UE 230 may also send the CSI feedback characterizing the primary and secondary links to one or more TRPs.

The improved techniques are applicable for both FD and TD CSI feedback. Depending on the backhaul state (ideal/non-ideal), the improved techniques involve feeding back a reduced overhead FD/TD independent/joint CSI estimation. The UE 230 may indicate the backhaul quality of each TRP when, for example, the CSI-RS configuration is indicated. The UE 230 may use the backhaul quality of each TRP in the grouping criteria, in some implementations allowing only TRPs with same backhaul quality in the same cluster/group.

A goal of the improved techniques presented herein is to reduce CSI feedback overhead for both TD and FD CSI feedback in high/medium density deployment scenarios of Multi-TRP/Panels and Cell-free massive MIMO. As mentioned above, the TRPs within a CSI cluster (e.g., CSI cluster 210) share a commonality in long-term CSI in connection to the UE 230. Accordingly, the UE should contribute to the decision on the clustering. Nevertheless, from the point of view of the network, the TRPs within CSI cluster 210 share a reliable backhaul quality (ideal or near-ideal backhaul) such that the exchange of the long-term CSI within the CSI cluster 210 is feasible.

To achieve this goal, there are several options to group the TRPs into CSI clusters:

The network 240 informs the UE 230 about the TRPs belonging to one network cluster 210 (i.e. TRPs which have ideal backhaul) beforehand. The UE 230 would then group the TRPs that have ideal backhaul connection only into a CSI cluster. For example, the UE 230 would indicate the backhaul quality during the time when the CSI-RS configuration is provided. Accordingly, each CSI-RS resource corresponding to a TRP would indicate the backhaul quality of the TRP from where that CSI-RS originates. In some implementations, a particular TRP index, while potentially helpful, is not necessary in this indication.

The UE 230 informs the network 240 about its choice of CSI cluster 210 (e.g. in uplink control signaling). The network 240 then responds with a modified choice of CSI cluster such that all TRPs within one CSI cluster have ideal backhaul (e.g. DCI).

The network indication of the TRP clusters can be an implicit or explicit indication. In some implementations, CSI feedback for multiple TRPs is scheduled by a TRP (primary or reference TRP from the perspective of the UE 230) within a network cluster, and the UE 230 implicitly indicates the network cluster to be the TRPs CSI calculation (and requested feedback). In some implementations, a higher layer configuration used for CSI resources can be associated with a TRP-ID or some other indication to distinguish TRPs. In this case, the UE 230 can determine the CSI cluster based on simultaneous CSI reporting requests. In some implementations, the network 240 indicates the TRPs associated with each CSI cluster 210, 220 in a separate indication.

In some implementations, the primary TRP is a reference TRP that the UE 230 uses to determine and simplify the CSI feedback for other TRPs. In some implementations, the primary TRP is the TRP scheduling or receiving a PUCCH or PUSCH transmission. In some implementations, the choice of the primary TRP is indicated by the network 240 (e.g. based on CQI feedback).

In some implementations, the fact is exploited that some of the spatial beams inside grid-of-beam matrix $W_1$ (selected from an oversampled DFT codebook) that are chosen by the UE connecting to one TRP x are also going to be chosen when the UE is connected to another TRP y, which belongs to the same CSI cluster as TRP x. Hence, after a full CSI update to one TRP x, the grid-of-beam matrix $W_1$ of another TRP y, can be taken partially or fully from the choice of the grid-of-beam matrix $W_1$ of TRP x.

In some implementations, the following process is followed in reducing CSI feedback overhead:

1. Within one CSI cluster, e.g., CSI cluster 210, a full UL CSI feedback is sent by the UE 230 to the primary TRP, TRP-1.
2. The CSI feedback including $W_1$ to the primary TRP is denoted by $W_{1,1}$.

$$xW_{1,x} = [W_{1,xc}\ W_{1,xs}]W_{1,xc}W_{1,xs}xW_{1,xc}2N_1N_2 \times L_c W_{1,xs}2N_1N_2 \times L_s 3.$$

For every other secondary TRP, the grid-of-beam matrix is built as $xW_{1,x}=[W_{1,xc}W_{1,xs}]W_{1,xc}W_{1,xs}xW_{1,xc}2N_1N_2{\times}L_cW_{1,xs}2N_1N_2{\times}L_s$, where denotes a part which is common to the grid-of-beam fed to the primary TRP and hence can be inferred from it, while denotes a part which is specific to secondary TRP. is of size and is of size.

4. The UE 230 only needs to feedback information on the specific part to the TRP x $W_{1,xs}$. This can reduce the overhead by $$\binom{N_1N_2}{L} + \log_2(O_1O_2) - \binom{N_1N_2 - L_c}{L_s}.$$

5. In some implementations, the TRP x can just use the common part $W_{1,xc}$ and no UE feedback is needed; this can reduce the overhead by $$\binom{N_1N_2}{L_c} + \log_2(O_1O_2)$$

as well as the signalling delay.

In some implementations, the fact is exploited that choice of the spatial beams inside grid-of-beam matrix $W_1$ (selected from an oversampled DFT codebook) that are chosen by the UE connecting to TRP y may be described using a 'shifted' version of choice of the spatial beams inside grid-of-beam matrix $W_1$ of TRP x.

In some implementations, the following process is followed in reducing CSI feedback overhead:
1. Within one CSI cluster, e.g., CSI cluster 210, a full UL CSI feedback is sent by the UE 230 to the primary TRP, TRP-1.
2. The CSI feedback including $W_1$ to the primary TRP is denoted by $W_{1,1}$.
3. Every other TRP x uses $W_{1,1}$ with a different horizontal and/or vertical rotation factors $O_1$ and $O_2$. This can lead to an overhead reduction of $$\binom{N_1N_2}{L} + \log_2(O_2)\binom{N_1N_2}{L} + \log_2(O_1)\binom{N_1N_2}{L}.$$

In some implementations, the fact is exploited that there will be a correlation in the choice of GoB matrix between the primary TRP and each secondary TRP. Therefore given that the UE and secondary TRP know the choice of GoB of the primary TRP, when the UE is reporting the GoB for the secondary TRP instead of choosing L beams out of $N_1N_2$ possible orthogonal beams, a reduced set of orthogonal beams is built of $N_1'N_2' < N_1N_2$ possible orthogonal beams, based on the choice of the primary TRP beams. The overhead saving for a feedback to a secondary TRP will be for example if combinatorial indexing is used to signal the GoB matrix $$\binom{N_1N_2}{L} + \log_2(O_1O_2) : -\binom{N_1'N_2'}{L}.$$

For example, the reduced set of orthogonal beams could be centred around the strongest beam of the primary TRP whose index is usually fed back to the gNB.

In some implementations, the fact is exploited that some of the FD components inside FD basis subset matrix $W_f$ (selected from an oversampled DFT codebook) that are chosen by the UE connecting to one TRP x are also going to be chosen when the UE is connected to another TRP y, which belongs to the same CSI cluster as TRP x. Hence, after a full CSI update to one TRP x, the FD basis subset matrix $W_f$ of another TRP y, can be taken partially or fully from the choice of the FD basis subset matrix $W_f$ of TRP x.

In some implementations, the following process is followed in reducing CSI feedback overhead:

1. Within one CSI cluster, e.g., CSI cluster 210, a full UL CSI feedback is sent by the UE 230 to the primary TRP, TRP-1.
2. The CSI feedback including $W_f$ to the primary TRP is denoted by $W_{f,1}$.
3. For every other TRP x, the FD basis subset matrix for each layer is built as $W_{f,x}=[W_{f,xc}W_{f,xs}]$, where $W_{f,xc}$ denotes a part which is common to the FD basis subset matrix fed to the primary TRP and hence can be inferred from it, while $W_{f,xs}$ denotes a part which is specific to TRP x. $W_{f,xc}$ is of size $N_3 \times M_c$ and $W_{f,xs}$ is of size $N_3 \times M_s$.
4. UE only needs to feedback information on the specific part to TRP x $W_{f,xs}$. This can reduce the overhead by $$\binom{N_3}{M} + \log_2(O_3) - \binom{N_3 - M_c}{M_s}.$$

5. In some implementations, TRP x can just use the common part $W_{f,xc}$ and no UE feedback is needed. This can reduce the overhead by $$\binom{N_3}{M_c} + \log_2(O_3)$$

as well as the signalling delay.

In some implementations, the fact is exploited that choice of the FD components inside FD basis subset matrix $W_f$ (selected from an oversampled DFT codebook) that are chosen by the UE connecting to TRP y may be described using a 'shifted' version of choice of the FD components inside FD basis subset matrix $W_f$ of TRP x.

In some implementations, the following process is followed in reducing CSI feedback overhead:
1. Within one CSI cluster, e.g., CSI cluster 210, a full UL CSI feedback is sent by the UE 230 to the primary TRP, TRP-1.
2. The CSI feedback including $W_f$ to the primary TRP is denoted by $W_{f,1}$
3. For every other TRP x, uses $W_{f,1}$ with a different rotation factor $O_3$. Note that currently in Rel.16, the oversampling factor is not fed back to the gNB. Hence this scheme can lead to an overhead reduction of $$\binom{N_3}{M} - \log_2 O_3.$$

In some implementations, the fact is exploited that in the time domain explicit CSI, the channel support vectors of a UE connected to two TRPs belonging to the same CSI cluster will have some common elements. Accordingly, after a full CSI update to one TRP x, the channel support vector of another TRP y $s_y$, can be taken partially or fully from the choice of the channel support vector of TRP x $s_x$. In some implementations, the reduced set of orthogonal beams is centered around the strongest beam of the primary TRP whose index is usually fed back to the gNB.

In some implementations, the following process is followed in reducing CSI feedback overhead:
1. Within one CSI cluster, e.g., CSI cluster 210, a full UL CSI feedback is sent by the UE 230 to the primary TRP, TRP-1.

2. The CSI feedback including s to the primary TRP is denoted by $s_1$.
3. For every other TRP x, the channel support vector is built as $s_x=[s_c\ s_{xs}]$, where $s_c$ denotes a part which is common to the channel support vector fed to the primary TRP and hence can be inferred from it, while $s_{xs}$ denotes a part which is specific to TRP x. $s_c$ is of size $1 \times N_{s,c}$ and $s_{xs}$ is of size $1 \times N_{s,s}$.

$$xs_c \binom{f_{os} \times L_{range}}{N_s} - \binom{f_{os} \times L_{range} - N_{s,c}}{N_{s,s}} 4.$$

The UE 230 only needs to feedback information on the specific part to TRP $$xs_c \binom{f_{os} \times L_{range}}{N_s} - \binom{f_{os} \times L_{range} - N_{s,c}}{N_{s,s}}.$$

This can reduce the overhead by.
5. In some implementations, TRP x can just use the common part $N_{s,c}$ and no UE feedback is needed; this can reduce the overhead by:

$$\binom{f_{os} \times L_{range}}{N_{s,c}}$$

as well as the signalling delay.

In some implementations, the fact is exploited that in time domain explicit CSI, the channel support vectors of a UE connected to two TRPs belonging to the same CSI cluster will have some correlation. Therefore, we can report the location of each tap inside the channel support vector of TRP y, $s_y(i)$ as a shifted version of the corresponding tap in TRP×$s_x(i)$. This reduces the overhead needed to report the channel support vector $s_y$.

In some implementations, the following process is followed in reducing CSI feedback overhead:
1. Within one CSI cluster, e.g., CSI cluster 210, a full UL CSI feedback is sent by the UE 230 to the primary TRP, TRP-1.
2. The CSI feedback including s to the primary TRP is denoted by $s_1$.
3. For every other TRP x, every $l^{th}$ element inside the channel support vector $s_x$ is reported differential to the corresponding $l^{th}$ element inside the channel support vector $s_1$.
4. Accordingly, rather than choosing from $f_{os} \times L_{range}$ possible tap locations, the $l^{th}$ tap is chosen from a set of D<<$f_{os} \times L_{range}$ possible taps.
5. The UL overhead reduction is then $$\binom{f_{os} \times L_{range}}{N_s} - N_s \times \log_2(D).$$

Figure 3:
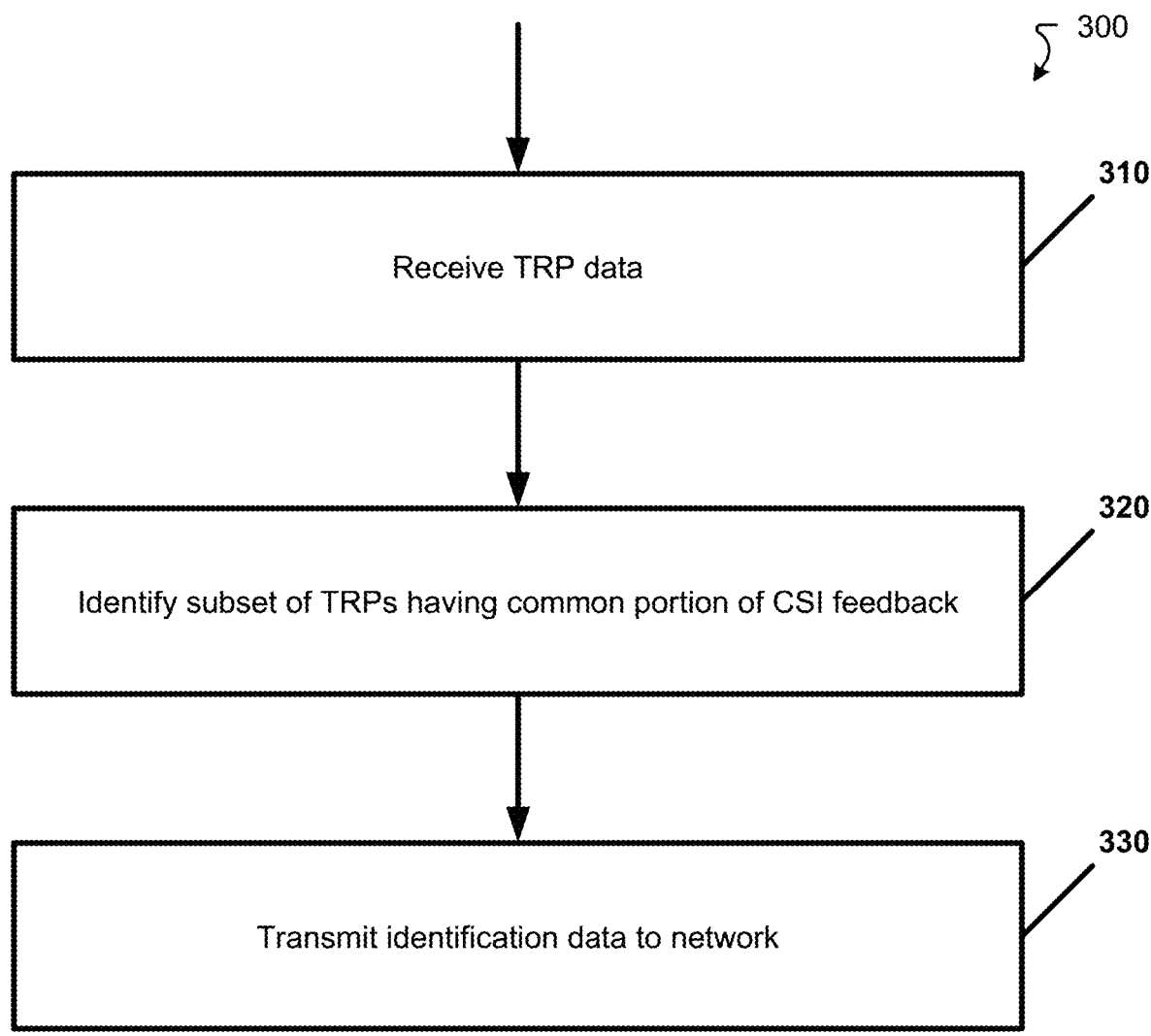
FIG. 3 is a flow chart illustrating a process of determining TRPs in a cluster according to an example implementation.

Example 1: FIG. 3 is a flow chart illustrating an example method 300 of performing the improved techniques. Operation 310 includes receiving, by controlling circuitry of a user equipment (UE), transmission and reception point (TRP) data representing respective channel state information (CSI) feedback for a plurality of TRPs connected to a network. Operation 320 includes performing an identification operation on the TRP data to identify a subset of TRPs of the plurality of TRPs, each TRP of the identified subset of TRPs having a common portion within their respective CSI feedback. Operation 330 includes transmitting, to the network, identification data representing the identified subset of TRPs.

Example 2: According to an example implementation of example 1, wherein receiving the TRP data includes receiving a reference signal, the reference signal including a plurality of reference symbols from each of the plurality of TRPs; and generating the CSI feedback based on the plurality of reference symbols.

Example 3: According to an example implementation of any of examples 1 or 2, wherein the identification data is first identification data, the reference signal is a CSI reference signal (CSI-RS), and the method further comprises receiving second identification data from the network representing a revised subset of TRPs, the second identification data being based on a quality of backhaul connections between the subset of TRPs.

Example 4: According to an example implementation of any of examples 1-3, wherein the identification data includes a primary TRP identifier identifying a primary TRP of the identified subset of TRPs, other TRPs of the subset of TRPs being secondary TRPs, and the method further comprises transmitting (i) an entire CSI feedback for the primary TRP to a TRP of the subset of TRPs and (ii) a portion of the respective CSI feedback that is not common to the subset of TRPs to each of the other TRPs of the subset of TRPs.

Example 5: According to an example implementation of example 4, wherein the primary TRP is a TRP configured to receive PUCCH and/or PUSCH transmission.

Example 6: According to an example implementation of examples 4 or 5, wherein the TRP to which the entire CSI feedback for the primary TRP is sent is the primary TRP.

Example 7: According to an example implementation of any of examples 1-6, wherein the CSI feedback for the plurality of TRPs is frequency domain CSI feedback including a respective grid of beams (GoB) matrix $W_1$, a respective matrix of linear combining coefficients $\tilde{W}_2$, and a respective frequency domain compression matrix $W_f$.

Example 8: According to an example implementation of example 7, wherein the common portion of the CSI feedback for the subset of TRPs includes at least one column of the GoB matrix $W_1$ for a primary TRP of the subset of TRPs.

Example 9: According to an example implementation of any of examples 7-8, wherein the GoB matrix $W_1$ for a first TRP of the subset of TRPs includes a shifted version of the GoB matrix $W_1$ for a second TRP of the subset of TRPs, and the method further comprises transmitting an entire CSI feedback for the primary TRP to the primary TRP, the CSI feedback for other TRPs of the subset of TRPs being deduced from the CSI feedback for the primary TRP.

Example 10: According to an example implementation of any of examples 7-9, wherein the common portion of the CSI feedback for the subset of TRPs includes data representing a reduced set of orthogonal beams selected from an oversampled grid of beams.

Example 11: According to an example implementation of any of examples 7-10, wherein the common portion of the CSI feedback for the subset of TRPs includes at least one column of the frequency domain compression matrix $W_f$ for a primary TRP of the subset of TRPs.

Example 12: According to an example implementation of any of examples 7-11, wherein the frequency domain compression matrix $W_f$ for a first TRP of the subset of TRPs includes a shifted version of the frequency domain compression matrix $W_f$ for a second TRP of the subset of TRPs, and the method further comprises transmitting an entire CSI feedback for the primary TRP to the primary TRP, the CSI feedback for other TRPs of the subset of TRPs being deduced from the CSI feedback for the primary TRP.

Example 13: According to an example implementation of any of examples 7-12, wherein a portion of the CSI feedback not common to the subset of the TRPs includes elements of the matrix of linear combining coefficients $\tilde{W}_2$.

Example 14: According to an example implementation of any of examples 1-13, wherein the CSI feedback for the plurality of TRPs is time domain explicit CSI feedback including a channel support vector s.

Example 15: According to an example implementation of example 14, wherein the common portion of the CSI feedback for the subset of TRPs includes at least one element of the channel support vector s.

Example 16: According to an example implementation of any of examples 14-15, wherein the channel support vector s for a first TRP of the subset of TRPs includes a shifted version of the channel support vector s for a second TRP of the subset of TRPs, and the method further comprises transmitting an entire CSI feedback for the primary TRP to the primary TRP, the CSI feedback for other TRPs of the subset of TRPs being deduced from the CSI feedback for the primary TRP.

Example 17: An apparatus comprising means for performing a method of any of examples 1-16.

Example 18: A computer program product including a non-transitory computer-readable storage medium and storing executable code that, when executed by at least one data processing apparatus, is configured to cause the at least one data processing apparatus to perform a method of any of claims 1-16.

Figure 4:
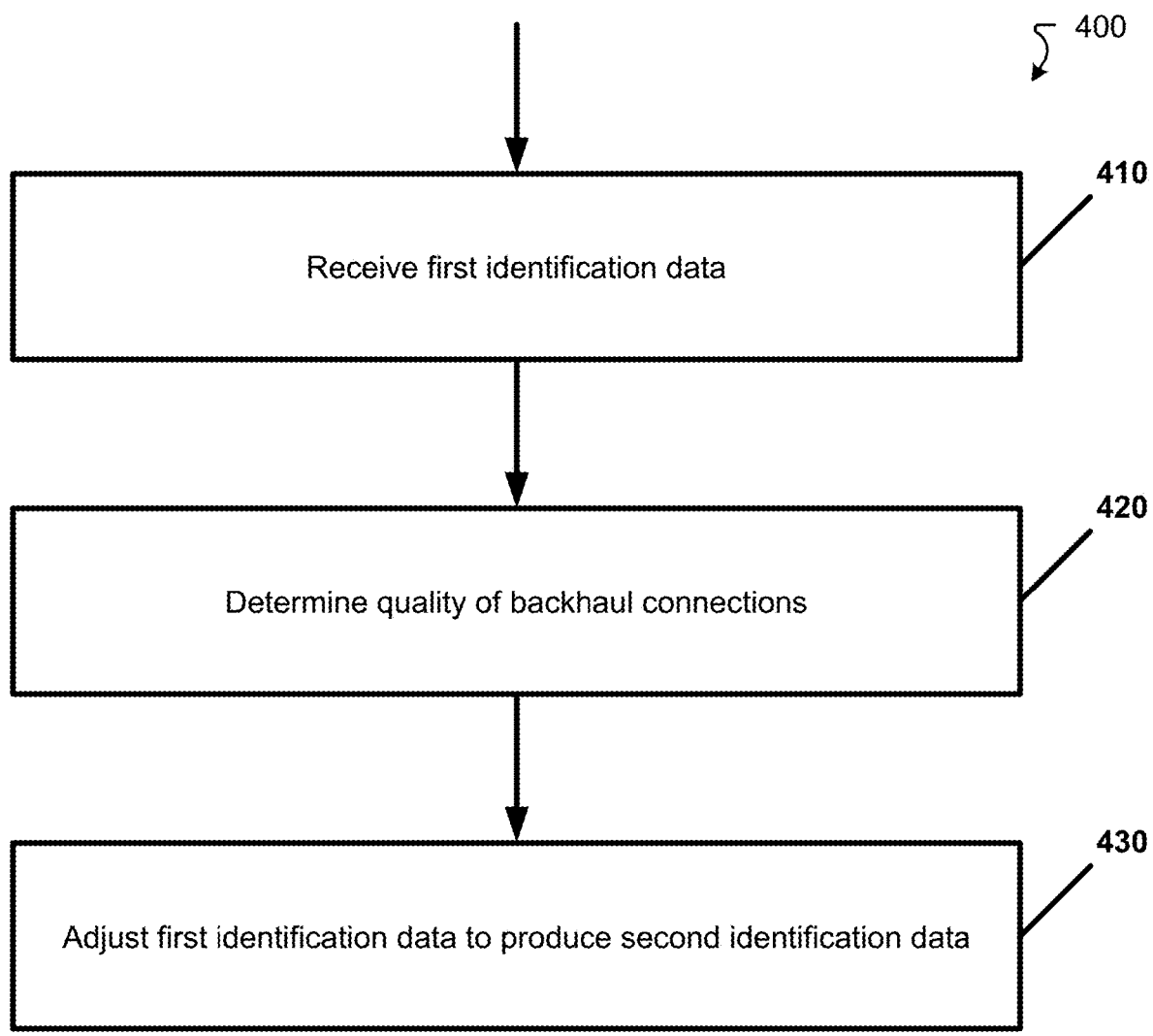
FIG. 4 is a flow chart illustrating a process of adjusting TRPs in a cluster based on quality of backhaul connections according to an example implementation.

FIG. 4 is a flow chart illustrating an example method 400 of performing the improved techniques. Operation 410 includes receiving, by controlling circuitry of a network processor and from a user equipment (UE), first identification data representing a set of transmission reception points (TRPs) of a plurality of TRPs. Operation 420 includes determining a quality of backhaul connections between the set of TRPs. Operation 430 includes adjusting the first identification data based on the determined quality of backhaul connections between the set of TRPs to produce second identification data.

Example 2: According to an example implementation of example 1, further comprising transmitting the second identification data to the UE.

Example 3: According to an example implementation of any of examples 1 or 2, wherein determining the quality of backhaul connections between the set of TRPs includes performing a count of a number of ideal backhaul connections between the set of TRPs.

Example 4: According to an example implementation of any of examples 1-3, further comprising, prior to receiving the first identification data, identifying the plurality of TRPs as a cluster of TRPs.

Further example implementations and/or example details will now be provided.

Figure 5:
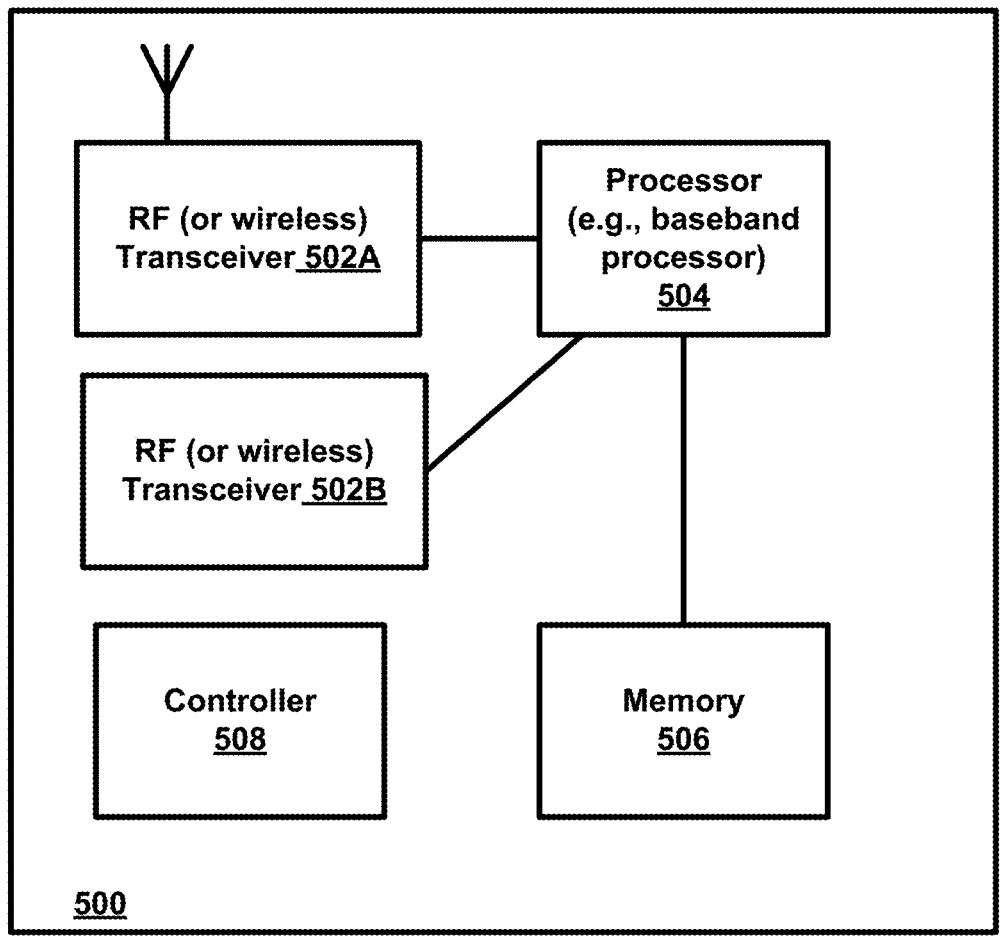
FIG. 5 is a block diagram of a node or wireless station (e.g., base station/access point, relay node, or mobile station/user device) according to an example implementation.

List of example abbreviations:
3GPP 3$^{rd}$ Generation Partnership Project
BWP Bandwidth part
CSI Channel state information
DFT Discrete Fourier Transform
DL Downlink
FDD Frequency division duplex
FD Frequency Domain
gNB Next generation NodeB
LC Linear combination
LTE Long-term evolution
MIMO Multiple-Input Multiple-Output
MR Maximum Rank
NR New radio
PMI Precoding matrix indicator
PRB Physical resource blocks
RB Resource block
SB Subband
SSB Synchronization Signal Block
TRP Transmission Reception Point
UL Uplink
WB Wideband
WI Work item
WID Work item description FIG. 5 is a block diagram of a wireless station (e.g., AP, BS, eNB, UE or user device) 500 according to an example implementation. The wireless station 500 may include, for example, one or two RF (radio frequency) or wireless transceivers 502A, 502B, where each wireless transceiver includes a transmitter to transmit signals and a receiver to receive signals. The wireless station also includes a processor or control unit/entity (controller) 504 to execute instructions or software and control transmission and receptions of signals, and a memory 506 to store data and/or instructions.

Processor 504 may also make decisions or determinations, generate frames, packets or messages for transmission, decode received frames or messages for further processing, and other tasks or functions described herein. Processor 504, which may be a baseband processor, for example, may generate messages, packets, frames or other signals for transmission via wireless transceiver 502 (502A or 502B). Processor 504 may control transmission of signals or messages over a wireless network, and may control the reception of signals or messages, etc., via a wireless network (e.g., after being down-converted by wireless transceiver 502, for example). Processor 504 may be programmable and capable of executing software or other instructions stored in memory or on other computer media to perform the various tasks and functions described above, such as one or more of the tasks or methods described above. Processor 504 may be (or may include), for example, hardware, programmable logic, a programmable processor that executes software or firmware, and/or any combination of these. Using other terminology, processor 504 and transceiver 502 together may be considered as a wireless transmitter/receiver system, for example.

In addition, referring to FIG. 5, a controller (or processor) 508 may execute software and instructions, and may provide overall control for the station 500, and may provide control for other systems not shown in FIG. 5, such as controlling input/output devices (e.g., display, keypad), and/or may execute software for one or more applications that may be provided on wireless station 500, such as, for example, an email program, audio/video applications, a word processor, a Voice over IP application, or other application or software.

In addition, a storage medium may be provided that includes stored instructions, which when executed by a controller or processor may result in the processor 504, or other controller or processor, performing one or more of the functions or tasks described above.

According to another example implementation, RF or wireless transceiver(s) 502A/502B may receive signals or data and/or transmit or send signals or data. Processor 504 (and possibly transceivers 502A/502B) may control the RF or wireless transceiver 502A or 502B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    generating, by a user equipment (UE), transmission and reception point (TRP) data representing respective channel state information (CSI) feedback for a plurality of TRPs connected to a network;
    performing an identification operation on the TRP data to identify a subset of TRPs of the plurality of TRPs, each TRP of the identified subset of TRPs having a common portion within their respective CSI feedback; and
    transmitting, to the network, identification data representing the identified subset of TRPs,
    wherein the CSI feedback for the plurality of TRPs is frequency domain CSI feedback including a respective frequency domain compression matrix $W_f$,
    wherein the frequency domain compression matrix $W_f$ for a first TRP of the subset of TRPs includes a shifted version of the frequency domain compression matrix $W_f$ for a second TRP of the subset of TRPs,
    and wherein the method further comprises transmitting, to a primary TRP, an entire CSI feedback for the primary TRP, the CSI feedback for other TRPs of the subset of TRPs being deduced from the CSI feedback for the primary TRP.

2. The method as in claim 1, wherein generating the TRP data includes:
    receiving a reference signal, the reference signal including a plurality of reference symbols from each of the plurality of TRPs; and
    generating the CSI feedback based on the plurality of reference symbols, and wherein the reference signal is a CSI reference signal (CSI-RS).

3. The method as in claim 2, wherein the identification data is first identification data,
and wherein the method further comprises:
    receiving second identification data from the network representing a revised subset of TRPs, the second identification data being based on a quality of backhaul connections between the subset of TRPs.

4. The method as in claim 1, wherein the identification data includes a primary TRP identifier identifying the primary TRP, the other TRPs of the subset of TRPs being secondary TRPs, and wherein the method further comprises:
    transmitting a portion of the respective CSI feedback that is not common to the subset of TRPs to each of the other TRPs of the subset of TRPs.

5. The method as in claim 1, wherein the primary TRP is a TRP configured to receive physical uplink control channel (PUCCH) and/or physical uplink shared channel (PUSCH) transmission.

6. The method as in claim 1, wherein the common portion of the CSI feedback for the subset of TRPs includes at least one column of the frequency domain compression matrix $W_f$ for the primary TRP of the subset of TRPs.

7. The method as in claim 1, wherein the CSI feedback for the plurality of TRPs is frequency domain CSI feedback further including a respective grid of beams (GoB) matrix $W_1$, and a respective matrix of linear combining coefficients $\tilde{W}_2$.

8. The method as in claim 7, wherein the common portion of the CSI feedback for the subset of TRPs includes at least one column of the GoB matrix $W_1$ for the primary TRP.

9. The method as in claim 7, wherein the GoB matrix $W_1$ for the first TRP of the subset of TRPs includes a shifted version of the GoB matrix $W_1$ for the second TRP of the subset of TRPs.

10. The method as in claim 7, wherein the common portion of the CSI feedback for the subset of TRPs includes data representing a reduced set of orthogonal beams selected from an oversampled GoB.

11. The method as in claim 7, wherein a portion of the CSI feedback not common to the subset of the TRPs includes elements of the matrix of linear combining coefficients $\tilde{W}_2$.

12. The method as in claim 1, wherein the CSI feedback for the plurality of TRPs is time domain explicit CSI feedback including a channel support vector s.

13. The method as in claim 12, wherein the common portion of the CSI feedback for the subset of TRPs includes at least one element of the channel support vector s.

14. The method as in claim 12, wherein the channel support vector s for the first TRP of the subset of TRPs includes a shifted version of the channel support vector s for the second TRP of the subset of TRPs.

15. An apparatus comprising:
    at least one processor; and
    at least one memory including computer program code,
    the at least one memory and the computer program code configured to, with the at least one processor, cause the apparatus at least to:
        generate transmission and reception point (TRP) data representing respective channel state information (CSI) feedback for a plurality of TRPs connected to a network;
        perform an identification operation on the TRP data to identify a subset of TRPs of the plurality of TRPs, each TRP of the identified subset of TRPs having a common portion within their respective CSI feedback; and
        transmit, to the network, identification data representing the identified subset of TRPs,
    wherein the CSI feedback for the plurality of TRPs is frequency domain CSI feedback including a respective frequency domain compression matrix $W_f$,
    wherein the frequency domain compression matrix $W_f$ for a first TRP of the subset of TRPs includes a shifted version of the frequency domain compression matrix $W_f$ for a second TRP of the subset of TRPs,
    and wherein the least one memory and the computer program code are further configured to, with the at least one processor, further cause the apparatus at least to:
        transmit, to a primary TRP, an entire CSI feedback for the primary TRP, the CSI feedback for other TRPs of the subset of TRPs being deduced from the CSI feedback for the primary TRP.

16. The apparatus as in claim 15, wherein the at least one memory and the computer program code configured to generate the TRP data, with the at least one processor, further cause the apparatus at least to:
- receive a reference signal, the reference signal including a plurality of reference symbols from each of the plurality of TRPs; and
- generate the CSI feedback based on the plurality of reference symbols, and wherein the reference signal is a CSI reference signal (CSI-RS).

17. The apparatus as in claim 15, wherein the identification data is first identification data,
and wherein the least one memory and the computer program code are further configured to, with the at least one processor, cause the apparatus at least to:
- receive second identification data from the network representing a revised subset of TRPs, the second identification data being based on an indicated quality of backhaul connections between the subset of TRPs.

18. The apparatus as in claim 15, wherein the identification data includes a primary TRP identifier identifying the primary TRP, the other TRPs of the subset of TRPs being secondary TRPs,
and wherein the least one memory and the computer program code are further configured to, with the at least one processor, cause the apparatus to:
- transmit a portion of the respective CSI feedback that is not common to the subset of TRPs to each of the other TRPs of the subset of TRPs.

19. The apparatus as in claim 15, wherein the primary TRP is a TRP configured to receive physical uplink control channel (PUCCH) and/or physical uplink shared channel (PUSCH) transmission.

20. The apparatus as in claim 15, wherein the common portion of the CSI feedback for the subset of TRPs includes at least one column of the frequency domain compression matrix $W_f$ for the primary TRP of the subset of TRPs.

21. The apparatus as in claim 15, wherein the CSI feedback for the plurality of TRPs is frequency domain CSI feedback further including a respective grid of beams (GoB) matrix $W_1$, and a respective matrix of linear combining coefficients $\tilde{W}_2$.

22. The apparatus as in claim 21, wherein the common portion of the CSI feedback for the subset of TRPs includes at least one column of the GoB matrix $W_1$ for the primary TRP.

23. The apparatus as in claim 21, wherein the GoB matrix $W_1$ for the first TRP of the subset of TRPs includes a shifted version of the GoB matrix $W_1$ for the second TRP of the subset of TRPs.

24. The apparatus as in claim 21, wherein the common portion of the CSI feedback for the subset of TRPs includes data representing a reduced set of orthogonal beams selected from an oversampled GoB.

25. The apparatus as in claim 21, wherein a portion of the CSI feedback not common to the subset of the TRPs includes elements of the matrix of linear combining coefficients $\tilde{W}_2$.

26. The apparatus as in claim 21, wherein the CSI feedback for the plurality of TRPs is time domain explicit CSI feedback including a channel support vector s.

27. The apparatus as in claim 26, wherein the common portion of the CSI feedback for the subset of TRPs includes at least one element of the channel support vector s.

28. The apparatus as in claim 26, wherein the channel support vector s for the first TRP of the subset of TRPs includes a shifted version of the channel support vector s for the second TRP of the subset of TRPs.

* * * * *